United States Patent
Hunter et al.

(10) Patent No.: US 10,201,840 B2
(45) Date of Patent: Feb. 12, 2019

(54) PROCESS FOR CLEANING A TRANSPORT BELT FOR MANUFACTURING A PAPER WEB

(71) Applicant: GPCP IP Holdings LLC, Atlanta, GA (US)

(72) Inventors: Mark S. Hunter, Green Bay, WI (US); Dean J. Baumgartner, Cecil, WI (US); David Drew Raines, Stone Mountain, GA (US); Theodore D. Kennedy, San Mateo, FL (US); David S. Veldhuizen, Green Bay, WI (US); Glenn W. Busch, De Pere, WI (US); Mitchell S. Edbauer, Green Bay, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 612 days.

(21) Appl. No.: 13/799,721

(22) Filed: Mar. 13, 2013

(65) Prior Publication Data
US 2013/0269734 A1    Oct. 17, 2013

Related U.S. Application Data

(60) Provisional application No. 61/622,622, filed on Apr. 11, 2012.

(51) Int. Cl.
*B08B 11/00* (2006.01)
*B08B 3/02* (2006.01)
(Continued)

(52) U.S. Cl.
CPC .............. *B08B 11/00* (2013.01); *B08B 3/022* (2013.01); *B65G 45/22* (2013.01); *D21F 1/32* (2013.01); *D21F 1/325* (2013.01); *B08B 2230/01* (2013.01)

(58) Field of Classification Search
CPC .. B08B 3/04; B08B 3/041; B08B 3/00; B08B 3/02; B08B 3/022; B08B 3/024; B08B 2230/01; D21F 1/32; D21F 1/325
(Continued)

(56) References Cited

U.S. PATENT DOCUMENTS

| 1,548,073 | A |   | 2/1924 | Vickery |
| 3,830,691 | A | * | 8/1974 | Truesdale et al. ............ 162/273 |

(Continued)

FOREIGN PATENT DOCUMENTS

| CA | 2078574 |   | 7/1992 |
| CN | 1451064 | A | 10/2003 |

(Continued)

OTHER PUBLICATIONS

International Search Report and Written Opinion of the International Searching Authority for PCT/US2013/033216 dated Jul. 11, 2013.

(Continued)

*Primary Examiner* — Sharidan Carrillo
(74) *Attorney, Agent, or Firm* — Laura L. Bozek

(57) ABSTRACT

The disclosure relates to a continuous cleaning method for cleaning a moving fabric in a paper machine. The method uses one or more cleaning stages. In one embodiment, one cleaning stage applies steam to heat and soften contaminants on the fabric followed by the application of water, preferably superheated water, to remove the contaminants. Another cleaning stage may apply hot water, steam and/or superheated water via an encapsulated shower and evacuation chamber making it possible to clean the width of the fabric without substantial rewet.

21 Claims, 4 Drawing Sheets

(51) Int. Cl.
*B65G 45/22* (2006.01)
*D21F 1/32* (2006.01)

(58) Field of Classification Search
USPC .......... 162/199, 272, 274, 275; 34/117, 444;
134/21, 26, 30, 32, 34, 35, 36, 42
See application file for complete search history.

(56) References Cited

U.S. PATENT DOCUMENTS

| | | | |
|---|---|---|---|
| 3,981,768 A | | 9/1976 | Lehtinen |
| 4,191,611 A | * | 3/1980 | Rushing et al. ............. 162/273 |
| 4,193,842 A | * | 3/1980 | Rushing ........................ 162/199 |
| 4,270,978 A | | 6/1981 | Fioravanti |
| 4,272,316 A | * | 6/1981 | Justus ........................... 162/206 |
| 4,309,246 A | | 1/1982 | Hulit et al. |
| 4,331,510 A | * | 5/1982 | Wells ............................ 162/290 |
| 4,482,429 A | * | 11/1984 | Klowak ........................ 162/111 |
| 4,540,469 A | * | 9/1985 | Lundstrom ................... 162/199 |
| 4,643,775 A | | 2/1987 | Reba et al. |
| 5,047,197 A | | 9/1991 | Uneback et al. |
| 5,106,655 A | | 4/1992 | Boissevain et al. |
| 5,120,400 A | | 6/1992 | Laapotti |
| 5,381,580 A | | 1/1995 | Kotitschke et al. |
| 5,669,159 A | * | 9/1997 | Orloff et al. .................... 34/398 |
| 5,853,493 A | | 12/1998 | Skelton et al. |
| 6,053,986 A | | 4/2000 | Oechsle et al. |
| 6,187,142 B1 | | 2/2001 | Heinzmann et al. |
| 6,254,731 B1 | | 7/2001 | Puurtinen et al. |
| 6,280,573 B1 | | 8/2001 | Lindsay et al. |
| 6,364,959 B1 | | 4/2002 | Straub et al. |
| 6,514,382 B1 | * | 2/2003 | Kakiuchi et al. ............. 162/109 |
| 6,579,418 B2 | | 6/2003 | Lindsay et al. |
| 7,112,260 B2 | | 9/2006 | Straub et al. |
| 7,293,572 B2 | | 11/2007 | Honkala et al. |
| 7,427,335 B2 | | 9/2008 | Aoki |
| 7,459,061 B2 | | 12/2008 | Passiniemi |
| 7,781,494 B2 | | 8/2010 | Okada et al. |
| 7,871,494 B2 | | 1/2011 | Viaser |
| 8,261,465 B2 | * | 9/2012 | Mayer et al. ................... 34/114 |
| 2003/0019602 A1 | * | 1/2003 | Straub et al. ................. 162/275 |
| 2003/0094255 A1 | | 5/2003 | Bartelmuss et al. |
| 2004/0011492 A1 | * | 1/2004 | Grabscheid et al. ......... 162/275 |
| 2006/0260063 A1 | | 11/2006 | Liew et al. |
| 2007/0209769 A1 | * | 9/2007 | Nogami et al. ............... 162/207 |
| 2007/0256711 A1 | * | 11/2007 | Hayashi et al. ................. 134/26 |
| 2009/0266388 A1 | * | 10/2009 | Legault ......................... 134/172 |
| 2009/0294085 A1 | | 12/2009 | Spachman et al. |
| 2012/0267063 A1 | * | 10/2012 | Klerelid et al. .............. 162/130 |

FOREIGN PATENT DOCUMENTS

| | | |
|---|---|---|
| DE | 4322565 A1 | 12/1993 |
| DE | 10144574 A1 | 3/2003 |
| DE | 10255471 A1 | 7/2004 |
| DE | 102005011690 A1 | 4/2006 |
| DE | 10 2005 052 858 A1 | 5/2007 |
| DE | 102007012785 A1 | 10/2007 |
| EP | 0522093 B1 | 12/1997 |
| EP | 0887460 B1 | 8/2002 |
| EP | 1384810 A2 | 1/2004 |
| EP | 1464754 A2 | 10/2004 |
| EP | 2006442 A1 | 12/2008 |
| GB | 1003698 * | 9/1965 |
| GB | 001003698 A * | 9/1965 |
| JP | S53-126305 A | 11/1978 |
| JP | S58-070791 A | 4/1983 |
| JP | 2000070888 | 7/2000 |
| JP | 2001-064891 A | 3/2001 |
| JP | 2002-509998 A | 4/2002 |
| JP | 2002282803 | 10/2002 |
| JP | 2007520638 | 2/2007 |
| JP | 4296329 B1 | 7/2009 |
| JP | 2010100973 A | 5/2010 |
| RU | 2104357 C1 | 2/1998 |
| WO | WO 99/50499 | 10/1999 |
| WO | WO 01/44565 A1 | 6/2001 |
| WO | WO 2006/090014 A1 | 8/2006 |

OTHER PUBLICATIONS

English machine translation of DE 4322565 A1, published Dec. 9, 1993, Voith GmbH.
English machine translation of DE 102007012785 A1, published Oct. 4, 2007, Metso Paper Inc.
English machine translation of JP 2010100973 A, published May 6, 2010, Dairii International KK.
English Language Abstract of DE 102007012785A1, which reference was published Oct. 4, 2007.
English Language Abstract of JP 4296329, which reference was published Jul. 15, 2009.
English Language Abstract of EP 1384810 A2, published Jan. 28, 2004.
English Language Abstract of EP 1464754 A2, published Oct. 6, 2004.
English Language Abstract of DE 102005011690 A1, published Apr. 27, 2006.
People's Republic of China First Office Action and Search Report, Chinese Application No. 201380013776.0, dated Jul. 28, 2015 (10 pages).
English Language Abstract of DE 10144574 A1, published Mar. 27, 2003, obtained from LexisNexis Total Patent.
English Lanouaoe Abstract of DE 10255471 A1, published Jul. 22, 2004, obtained from LexisNexis Total Patent.
English Language Abstract of EP 0522093 B1, published Dec. 10, 1997, obtained from LexisNexis Total Patent.
English Language Abstract of EP 0887460 B1, published Aug. 14, 2002, obtained from LexisNexis Total Patent.
English Language Abstract of EP 2006442 A1, published Dec. 24, 2008, obtained from LexisNexis Total Patent.
English-Language abstract of DE 10 2005 052 858 A1.
J-PlatPat machine translation of JP 2001-064891 A.
J-PlatPat machine translation of JP S53-126305 A.
J-PlatPat machine translation of JP S58-070791 A.
EPO machine translation of RU 2104357.
Machine translation of JP 2000700888 dated Jul. 3, 2000.
Machine translation of JP 2002282803 dated Oct. 2, 2002.
Machine translation of JP 2007520638 dated Feb. 26, 2007.

* cited by examiner

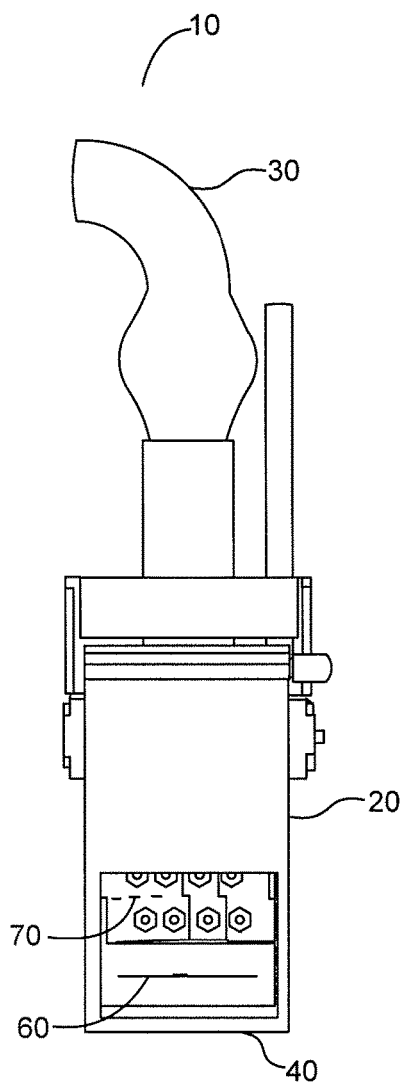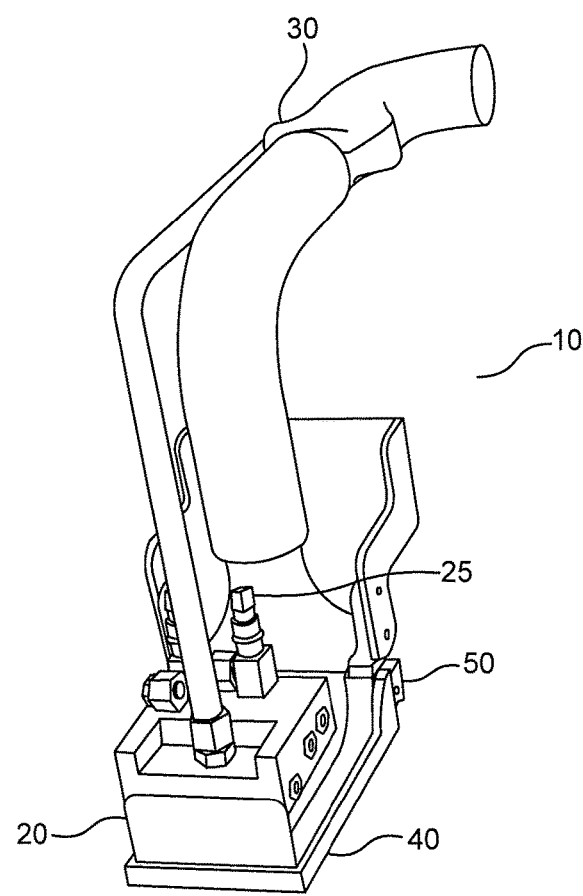
Fig. 2A
(Prior Art)
Fig. 2B
(Prior Art)

PROCESS FOR CLEANING A TRANSPORT BELT FOR MANUFACTURING A PAPER WEB

This disclosure relates to cleaning equipment and methods for cleaning a moving fabric used in the manufacture of paper webs. This disclosure further relates to cleaning equipment and methods for continuous cleaning of a moving fabric in a paper machine. Still further, this disclosure relates to cleaning equipment and a method for continuous cleaning of a moving fabric in a paper machine which minimizes rewet.

More particularly, this disclosure relates to a cleaning system including both an initial cleaning shower and a second cleaning shower. The disclosed dual cleaning arrangement results in a continuous cleaning system that does not suffer from areas of residue contamination that can result in poor fabric performance. The disclosure relates to an improved initial cleaning shower that provides enhanced contaminant removal and exceptional residual water uptake. Further, the disclosure relates to an improved second cleaning shower that also provides enhanced contaminant removal and further prevents residual water uptake by the fabric.

Still more particularly, this disclosure relates to the application of steam to a moving fabric in a paper making machine to thereby heat and soften contaminants in the fabric making them easier to remove by subsequent water showers. This disclosure further relates to the application of steam to a moving fabric to heat and soften contaminants followed by the application of superheated, i.e., pressurized water to remove the contaminants. In one embodiment, the steam and superheated water are applied in the initial cleaning shower. In another embodiment, the steam and superheated water are applied in both the initial cleaning shower and in the second cleaning shower.

This disclosure also relates to a cleaning method that can use only water without the need for additional chemical additives to achieve appropriate fabric cleaning. Finally, this disclosure relates to a method for cleaning a moving fabric used in the manufacture of paper webs that enhances the removal of cleaning media from the fabric to minimize web rewet.

Cleaning systems for papermaking fabrics are known in the art. Most suffer from issues of insufficient cleaning or an inability to run during paper machine operation due to issues with damage to or rewet of the fibrous structure that is being produced. Prior art configurations vary, but they generally use a pressurized cleaning solution that is applied to the fabric via a nozzle. Known systems include, for example, shower bars, rotating nozzles and angled nozzles all in an attempt to improve fabric cleaning. Prior art systems have struggled to find a cleaning method which adequately cleans the fabric without undue wear and tear or damage to the fabric. Contamination, water holes and fabric wear have also impeded the development of continuous cleaning methods. The cleaning method and equipment as described herein provide a number of advantages over the known cleaning systems.

BRIEF DESCRIPTION OF THE DRAWING

FIG. 2A is a front cut-away view of a standard initial traversing cleaning shower for use with the present invention.

FIG. 2B is a front perspective view of a standard initial traversing cleaning shower for use with the present invention.

DESCRIPTION

Figure 1:
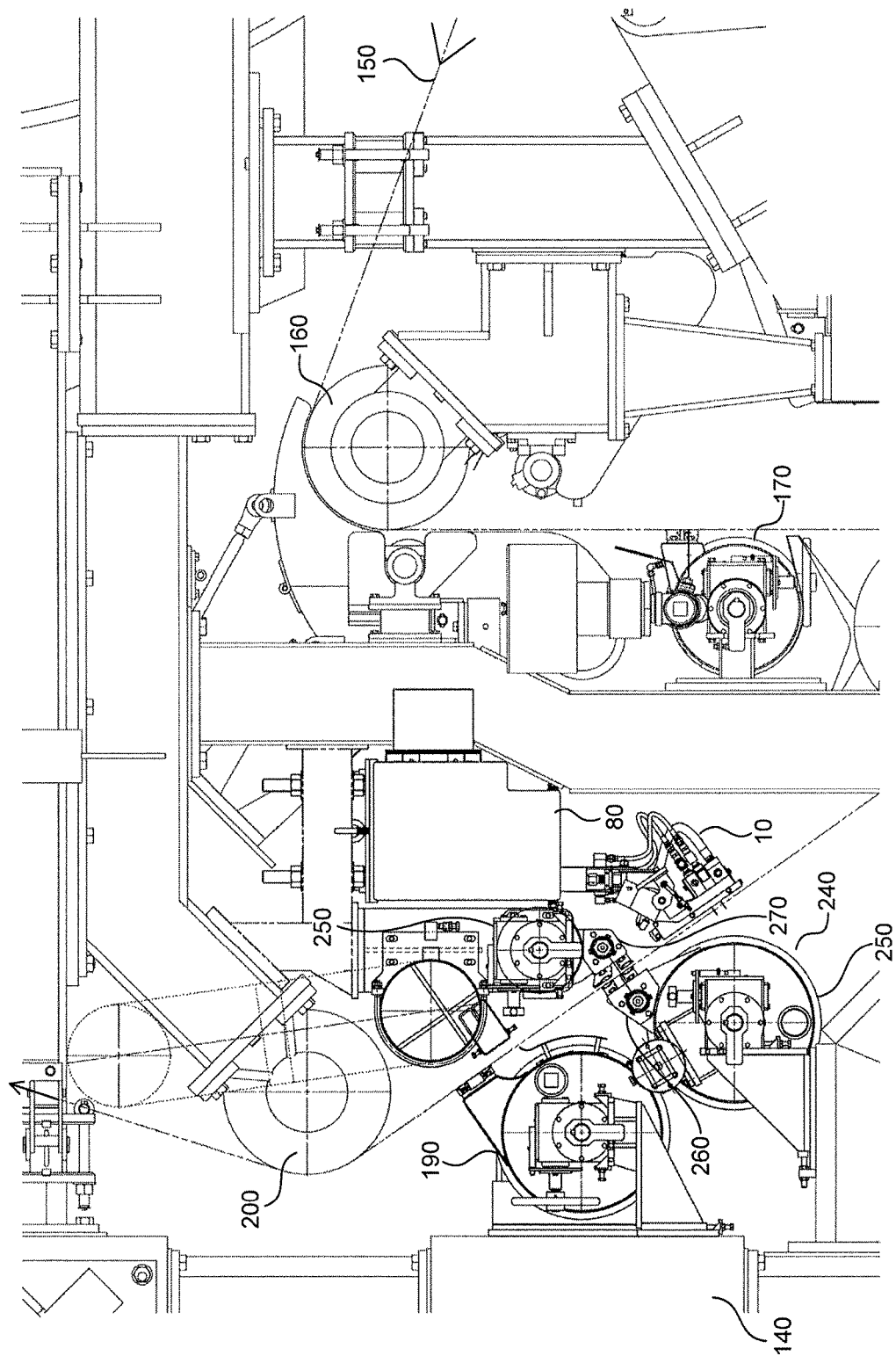
FIG. 1 is a side view of a cleaning system of the present invention, mounted on a papermaking machine for cleaning a moving fabric.

The present disclosure describes a method and equipment for cleaning a papermaking fabric. Wires, felts and belts used on papermaking machines are subjected to conditions that cause an accumulation of contaminants, including fibers, clay and foreign matter, to build up on them. The accumulation of contaminants can be exacerbated when recycle or other low grade fibers are introduced. These accumulations, if not removed, can create significant operational issues, from mild inefficiencies to requiring that the machine be shut down until the accumulation can be removed.

The present disclosure describes cleaning equipment and methods for cleaning a moving fabric that achieve significant improvements over prior cleaning systems when used to clean a moving fabric in a papermaking machine. These improvements may include, but are not limited to, improved contaminant removal; reduced loss due to machine down time since the papermaking machine need not cease operation to apply this cleaning method; improved water removal resulting in minimal rewet of the paper structure that may be on the fabric; and reduced cost since it requires no cleaning solutions. Further, because the process of the present invention doesn't require cleaning agents, it can be free of volatile organic compounds ("VOCs"). As used herein, "fabric" refers to any circulating web or belt used in a papermaking machine to convey a paper web. Examples of these fabrics are forming wires, press belts, transfer fabrics, and dryer fabric(s). According to one embodiment, the cleaning as disclosed may be carried out on transfer fabric(s) carrying a nascent web to the drying section of the paper machine. According to another embodiment, the cleaning method as disclosed may be used to clean drying fabrics in the drying section of the paper machine.

The continuous cleaning method according to the present invention includes two cleaning stages and assemblies. As used herein "continuous" cleaning method refers to a cleaning process that can be carried out on the fabric while the machine is producing a product and without ceasing that product production. As used herein "initial cleaning shower" refers to the first cleaning assembly that the fabric encounters and "initial cleaning stage" refers to the period of contact between the fabric and the initial cleaning shower. The term "second cleaning shower" refers to the second cleaning assembly that the fabric encounters and the term "second cleaning stage" refers to the period of contact between the fabric and the second cleaning shower. As will be readily apparent to the skilled artisan, additional cleaning assemblies may be included before or after the second cleaning shower if they are considered necessary to achieve the desired cleaning result.

According to one embodiment, the initial cleaning shower reduces the overall contaminant load on the fabric making it possible for the second cleaning shower to continuously clean the fabric to a level that does not require costly shut downs of the machine. The operation of each cleaning shower has been modified over that which was known in the prior art. These changes provide substantial improvements in each of the cleaning stages and together create a very effective continuous cleaning system.

The initial cleaning shower may have any art recognized configuration. It may include a shower or nozzle or series of showers or nozzles that are stationary or that reticulate or traverse the cross-machine direction width of the papermaking fabric. In one embodiment, the initial cleaning shower may be a series of nozzles or a shower bar that allows application of cleaning media to the entire width of the papermaking fabric simultaneously. According to another embodiment, the initial cleaning shower is a traversing shower that reticulates back and forth across the papermaking fabric. The nozzles may move, e.g., rotate, or be stationary. The specific configuration of the shower or nozzles can vary, including for example, in size, shape, type, or geometry without impacting the effectiveness of the disclosed method.

Optimal settings including nozzle type, cleaning media, cleaning media pressure and temperature, and distance between the cleaning assembly and the fabric to be cleaned are routinely selected based upon the nature of the fabric to be cleaned and the number and size of the nozzles. Correlations are generally provided by the manufacturer of such nozzles and shower systems. According to one embodiment, when superheated pressurized water is the selected cleaning media, the distance between the fabric and the nozzle should be reduced as the jet of pressurized water will break earlier than a regular water jet.

As used herein cleaning media includes but is not limited to water, steam, superheated water, cleaning solutions, and non-water based solvents with low vapor pressures. An example of a non-water based solvent with low vapor pressure would be Novec™ Fire Protection Fluid manufactured by 3M.

The initial cleaning shower and method of using the initial cleaning shower include the application of steam to a moving fabric in a paper making machine to thereby heat and soften contaminants on and in the fabric, making them easier to remove by subsequent water showers. Contaminants that are typically found on paper making fabrics include fibers, pitch, particles, dirt, and adhesives. As discussed above, additional cleaning stages may be included, as desired. The present disclosure contemplates the application of steam followed by superheated water in a single stage or in multiple stages spaced along the fabric in the machine direction.

According to one embodiment, the steam is applied in a superheated state. As used herein "superheated steam" refers to steam, not in contact with its own liquid, heated to beyond its saturation point at a given pressure. Steam is applied at a temperature of from about 105° C. to about 150° C., such as from about 110° C. to about 135° C.

Following the application of steam which heats and softens contaminants is at least one application of superheated water to remove the softened contaminants. At least one nozzle in the initial cleaning shower directs water, preferably at a temperature of greater than 100° C., to the surface of the fabric. As discussed above for the application of steam, the specific configuration of the shower or nozzles can vary. While the present invention is discussed in terms of the application of superheated water, the temperature of the water following the steam application can be from room temperature upward. The hotter the water the better the cleaning will be. Therefore, while hot water can be used, water close to or above 100° C. is preferred.

According to one embodiment, the superheated water may be at a temperature between 100° C. and 135° C., such as between 105° C. and 120° C. As used herein "superheated water" refers to water that has been heated to above its boiling point without vaporization. The superheated, and thus pressurized, water can be at a pressure of from 20 bar to 55 bar, such as from 25 bar to 35 bar.

As with steam, the superheated water may be applied to the paper making fabric through a nozzle or series of nozzles that are stationary or that reticulate or traverse the width of the papermaking fabric. According to one embodiment of the present disclosure, the steam applicator and superheated water applicator are contained in the same traversing shower. As with the steam, the water may be a single application or may include introduction in more than one location along the machine direction of the fabric.

Not wishing to be bound by theory, it is believed that the release of the pressurized water and its subsequent conversion to steam provides better penetration of the water into the fabric and provides improved lifting and removal of contaminants that have already been heat softened by the earlier steam application. Further, it is believed that the additional heat in the fabric assists in more effectively removing water after cleaning.

The steam and superheated water may be produced using any art recognized method. According to one embodiment, water is contacted with an electrical heating element to produce either steam or superheated water. According to another embodiment, the steam and/or superheated water are heated by contact with a heat exchanger. According to still a further embodiment, steam is removed from another point in the papermaking process and used in the disclosed cleaning process.

The described cleaning method, according to one embodiment, includes a debris collection source for removing excess steam, condensed water, and the effluent carrying the contaminants from the fabric. Such a debris collection source can include any suction device, for example, a vacuum box, an air knife or an air shower. A typical debris collection source includes at least one vacuum source. Appropriate placement of the debris collection source(s) will be readily apparent to the skilled artisan based upon the arrangement and location of the steam and water applicators. In one embodiment, a vacuum source is a single source that runs the width of the papermaking fabric. According to another embodiment, a vacuum source is associated with, or is integral with, a traversing cleaning shower. According to a still further embodiment, the debris collection source includes both a vacuum source and an air knife.

According to one embodiment, the debris collection source is integral with the steam and water application sources to minimize the amount of water or steam that cascades to other parts of the papermaking machine. According to one embodiment, the debris collection source is at least one vacuum source that is proximal to, and in the same housing with, the steam and water application sources.

While the majority of contaminants accumulate on the sheet side of the fabric, the cleaning method as described can be applied to one or both sides of the fabric to be cleaned. According to one embodiment, the cleaning is carried out on the sheet side of the fabric. According to another embodiment, the cleaning is carried out on the non-sheet side of the fabric. According to yet another embodiment, the cleaning method is carried out on both sides of the fabric to be cleaned. According to this embodiment, both steam and superheated water may be applied to both sides of the fabric. According to this embodiment, steam may be applied to the sheet side of the fabric and superheated water may be applied to the non-sheet side of the fabric.

The continuous cleaning method as described includes a second cleaning shower. The second cleaning shower may have any art recognized configuration. It may include a shower or nozzle or series of showers or nozzles that are stationary or that reticulate or traverse the cross-machine direction width of the papermaking fabric. In one embodiment, the second cleaning shower may be a series of nozzles or a shower bar that allows application of cleaning media to the entire width of the papermaking fabric simultaneously. The nozzles may move, e.g., rotate, or be stationary. The specific configuration of the shower or nozzles can vary, including for example, in size, shape, type, or geometry without impacting the effectiveness of the disclosed method.

According to one embodiment, the second cleaning shower is an encapsulated shower that spans the width of the fabric to be cleaned. As used herein, "encapsulated" refers to any shower arrangement that applies cleaning media and is configured in a manner that causes the applied cleaning media to be withdrawn without significant deposition on the papermaking machine. Such encapsulation systems generally include both sheet side and non-sheet side application/collection assemblies. According to one embodiment, the sheet side includes an application shower that extends the width of the papermaking fabric and the non-sheet side includes an elimination assembly. According to another embodiment, the sheet side includes both application showers and elimination assemblies and the non-sheet side, likewise, includes both application showers and elimination assemblies.

The elimination assembly for the second cleaning shower removes water, excess steam, and the effluent carrying the contaminants from the fabric. Such an elimination source can include any suction device, for example, a vacuum box, air knife or an air shower. A typical elimination assembly includes one or more vacuum sources. Appropriate placement of the elimination assembly will be readily apparent to the skilled artisan based upon the arrangement and location of the application nozzles in the associated application shower. In one embodiment, the vacuum source is a single source that runs the width of the papermaking fabric. According to another embodiment, the vacuum source includes a plurality of sources associated with each application nozzle or group of nozzles.

According to one embodiment, the second cleaning shower includes the application of one or more of steam and superheated water as described above. Further, the steam and superheated water can be produced by the methods and applied at the temperatures and pressures described. According to another embodiment, the second cleaning shower includes one or more heated water application(s). The cleaning water may be from room temperature upward, however, the hotter the water the better the cleaning will be. Therefore, while hot water can be used, water close to or above 100° C. is preferred. The water in the second cleaning shower can be applied at a temperature of from about 20° C. to about 100° C., such as from 80° C. to about 100° C.

According to one embodiment, the second cleaning shower applies cleaning media to the sheet side of the fabric. According to another embodiment, the second cleaning shower applies cleaning media to the non-sheet side of the fabric. According to yet another embodiment, the cleaning method is carried out on both sides of the fabric to be cleaned. According to this embodiment, both steam and superheated water may be applied to both sides of the fabric. According to this embodiment, steam may applied to the sheet side of the fabric and superheated water may be applied to the non-sheet side of the fabric.

The elimination source for the encapsulated shower may also include means for confining and eliminating the mist that may be generated by the application of cleaning media. According to one embodiment, such a mist eliminator includes a cover portion that runs the length of the papermaking fabric. According to another embodiment of the disclosure, the mist eliminator housing is in close proximity to the papermaking fabric, thereby capturing what is thrown off during the application of the cleaning media, including but not limited to, mist, water droplets, steam, and effluent. The gap between the mist eliminator and the moving papermaking fabric is from about 0.25 cm to about 2.54 cm, such as about 0.60 cm to about 1.30 cm.

According to one embodiment, either or both of the mist elimination assemblies that make up the encapsulated shower may be mounted on pivoting brackets to allow them to be moved away from the papermaking fabric should either assembly require cleaning and/or repair. The units are fitted with handles allowing them to swing in a counter-clockwise manner away from the papermaking fabrics.

This cleaning method as disclosed may be used to clean a moving fabric on a papermaking machine that has ceased producing product, however, the continuous cleaning method as described has the advantage that it may be carried out on a moving fabric during a production run. When cleaning must be carried out on a machine that has ceased production, the down time associated with cleaning is from 30 minutes to 1 hour. In the average production of tissue, the production must be stopped and the fabrics cleaning on the order of once every 8 hours. Thus, the presently disclosed cleaning method can result in 6 to 12% improved production over prior art cleaning methods.

Surprisingly, the cleaning method as described allows cleaning of the fabric without substantial rewet of the nascent paper web. The amount of water remaining in the fabric after the second cleaning shower is less than about 0.5 g/m$^2$, such as less than about 0.4 g/m$^2$, such as less than 0.3 g/m$^2$.

Further, the mounting of the encapsulated showers on pivoting brackets, which when driven by a rotation mechanism, e.g., a rotator and gearbox, allows the showers to be rotated away from the paper making fabric, while the machine is still in production. This "on-the-run" rotational capability allows the cleaning unit to be quickly repaired, cleaned or unclogged without any machine down time and with little build-up of contaminants on the papermaking fabric.

The system of the present invention may also include one or more additional application stations depending upon the fabric to be cleaned and the configuration of the cleaning system used. These additional application stations may include for example, an air knife or a fabric treatment applicator. In one embodiment, the one or more application stations includes at least one air knife which may be positioned before one or more of the showers to remove loose contaminants, or positioned after one or more of the showers to remove residual water from the fabric after cleaning. Additionally, an application station may be used for applying a cleaning solution or other chemical agent to assist in the cleaning of the contaminants, e.g, applying a chemical cleaning solution to pre-treat the fabric. The placement of these additional application stations before, integral with, or after the cleaning showers will be readily discernible based upon the desired function and anticipated outcome.

According to one embodiment, the cleaning method of the present invention includes at least one cleaning or conditioning agent added during either the initial cleaning stage or the second cleaning stage via the steam application, during the water application or via a separate applicator before, during or after the steam and water application. According to one embodiment, the at least one conditioning agent is added to the fabric in superheated water.

According to another embodiment, release agents are added to condition the fabric. Release agents may be added in the superheated water application. In one embodiment, release oil is added during the application of the superheated water. The addition of release oils and conditioning agents during fabric cleaning may result in extended roll cover life and easier sheet release from the clothing.

The cleaning method of the present invention reduces the wear on machine rolls. Prior art systems that were periodic in nature, e.g., every 8 hours, caused the fabrics to run dry increasing friction wear. The average life of a papermaking transfer roll prior to the present invention was about 25 days. With the cleaning system of the present invention, no substantial wear was noted at 35 days, see Example 3. Thus, the present invention can significantly extend the life of papermaking rolls by continually lubricating them so that they do not run with increased friction loads.

The cleaning method of the present disclosure will now be described with respect to one system embodiment. Deviations from this system and alternatives to the proposed system would be readily apparent to the skilled artisan.

A fabric cleaning apparatus attached to a paper machine 140 including both a traversing shower 10 and an encapsulated shower assembly 240 is illustrated in FIG. 1. As can be seen from the directional arrow, the fabric 150 travels over roll 160 and contacts vacuum box 170 which removes any loose debris and/or residual water from the fabric 150 prior to cleaning. The fabric 150 then travels around another roll (not seen) and contacts traversing shower 10. The traversing shower 10 reticulates in beam assembly 80. Traversing shower 10, contact the fabric 150 first with steam and then with superheated water. An air knife 50 then uses pressurized air to remove any residual water from the fabric 150 and prevent mist and droplets from escaping from the traversing shower assembly 10.

The fabric 150 then travels between the upper and lower boxes 260, 270 of the encapsulated shower assembly 240. Heated water and/or steam is applied to both surfaces of the moving fabric 150 and the effluent is removed via vacuum sources 250. The fabric 150 continues on, passes air knife (not numbered), and contacts vacuum box 190 before passing over roll 200 on its return to its web pick up location.

Figure 2C:
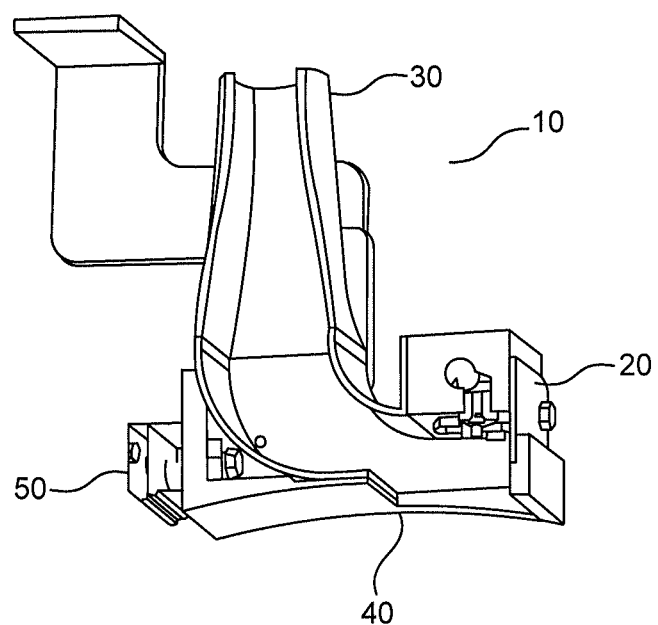
FIG. 2C is a side cut-away view of a standard traversing cleaning shower for use with the present invention.

A typical traversing shower 10 as illustrated in FIG. 1 is expanded in FIGS. 2A-2C. As seen in FIG. 2B, the shower 10 includes a nozzle assembly 20 and a collection chute 30. The traversing shower 10 contacts the fabric to be cleaned via surface 40. When used in accordance with the present disclosure, steam and superheated water may be introduced via inlets 25 on nozzle assembly 20 and effluent is collected via vacuum applied through collection chute 30. Air knife 50, causes an air jet to impinge upon the surface of the fabric and further remove water from the fabric. The moisture removed by the air knife will either go into the surrounding environment or will be removed by vacuum if the air knife includes an associated collection chute. Steam may be applied via a steam slot 60 and superheated water may be applied via water nozzles 70, as seen in FIG. 2A. The used steam and water, along with the released contaminants are picked up by collection chute 30 as illustrated in FIG. 2C.

Figure 3:
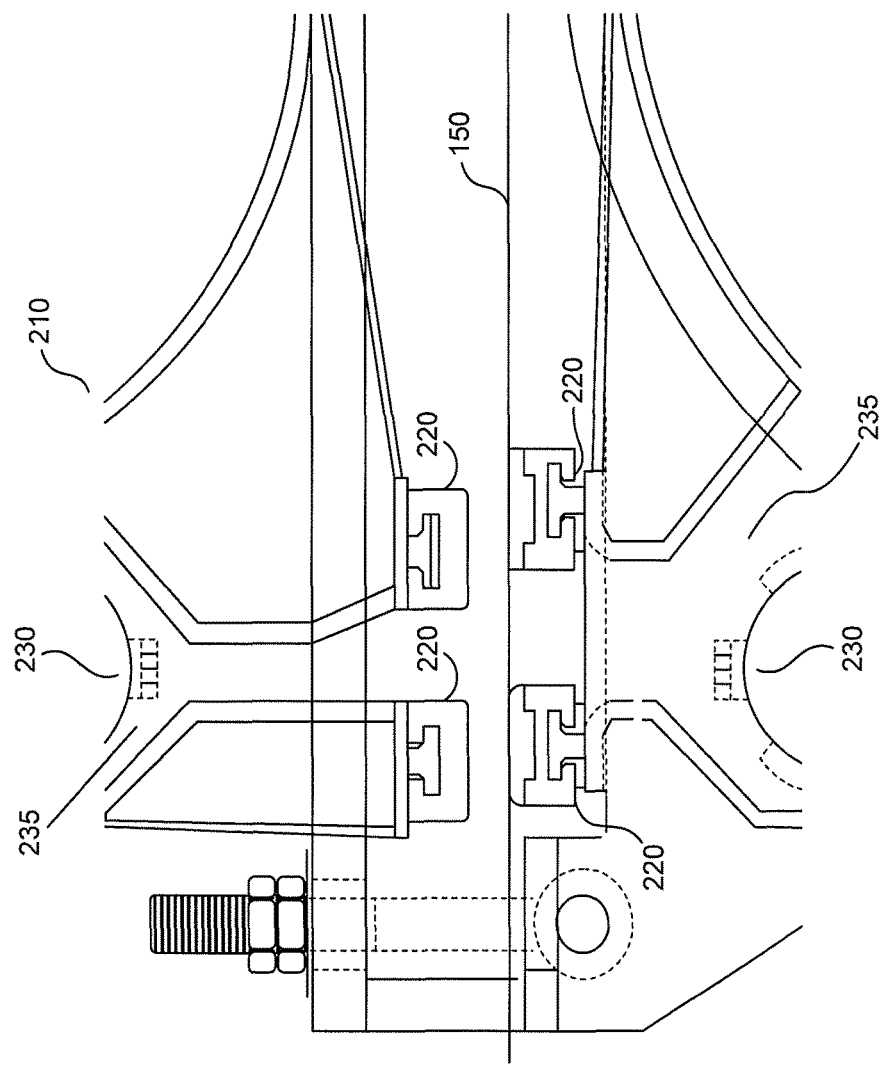
FIG. 3 is a side view of an encapsulated second cleaning shower that eliminates mist.

The mist eliminator 210 illustrated in FIG. 3 forms part of the encapsulated shower assembly 240 as illustrated in FIG. 1. The fabric 150 travels between deckle strips 220 on upper and lower boxes 260, 270 (FIG. 1). Cleaning media applicators 230 apply cleaning media to the fabric while waste is removed by vacuum sources 250 (not shown) via conduits 235.

While a continuous cleaning method has been described primarily in terms of two types of cleaning stages, a traversing shower stage and an encapsulated shower stage, the method can be practiced with one of the two stages or with multiple stages of a single type, e.g., just an encapsulated stage, two encapsulated stages may be used or alternatively two traversing stages may be used.

As used herein, "about" is meant to account for variations due to experimental error. All measurements are understood to be modified by the word "about", whether or not "about" is explicitly recited, unless specifically stated otherwise. Thus, for example, the statement "a fiber having a length of 2 mm" is understood to mean "a fiber having a length of about 2 mm."

The details of one or more non-limiting embodiments of the invention are set forth in the examples below. Other embodiments of the invention should be apparent to those of ordinary skill in the art after consideration of the present disclosure.

EXAMPLES

Example 1

A transfer fabric on an operating tissue paper machine was continuously cleaned in accordance with the present invention by the application of steam and a water shower at 80° C. to the structured paper fabric in an initial traversing cleaning shower. The transfer fabric was then passed through a second encapsulated shower which also applied steam and water at 80° C. The cleaning was continued for 30 hours and provided marked improvement in the fabric hygiene. Improvement was judged visually by observing the amount of external contamination that remained on the fabric. Concrete indicators of the improved fabric hygiene included achieving adequate cleaning without the need for cleaning component to be added to the water and a 50% reduction in the release chemistry that was added to the fabric to prevent contaminants from sticking.

Example 2

A transfer fabric on an operating tissue paper machine was continuously cleaned in accordance with the present disclosure by the simultaneous application of steam and water at 80° C. to the structured paper fabric in an initial cleaning shower. Steam was added through a full width steam shower, while water was applied through a traversing cleaning shower. The transfer fabric was then passed through a second encapsulated shower which also applied steam and water at 80° C. The cleaning was continued for 3.5 hours and provided results consistent with those seen in Example 1.

Example 3

A transfer fabric on an operating tissue paper machine was continuously cleaned in accordance with the present invention by the application of steam to the structured paper fabric in an initial traversing cleaning shower. The transfer fabric was then passed through a second encapsulated shower which also applied water at 80° C. The cleaning was continued over a 6 month period and provided marked improvement in the fabric hygiene, fabric wear, roll life, and machine down time. Improvements in fabric hygiene and fabric wear were judged visually by observing the fabric while roll life was confirmed by physical measurements.

Example 4

A transfer fabric or a drying fabric on a paper machine is continuously cleaned in accordance with the present invention by the application of steam and superheated water at a temperature of greater than 100° C., in an initial traversing cleaning shower. The transfer fabric is then passed through a second encapsulated shower which also applies steam and superheated water. The cleaning is carried out continuously and indefinitely.

A number of embodiments have been described. Nevertheless, it will be understood that various modifications may be made without departing from the spirit and scope of the disclosure. Accordingly, other embodiments are within the scope of the following claims.

We claim:

1. A method for continuous cleaning a transfer or drying papermaking fabric during paper production comprising:
   producing a paper web on a papermaking machine using a transfer or drying fabric to be cleaned, the fabric having a width and length and traveling in a machine direction;
   subjecting the fabric to be cleaned to an initial cleaning stage, wherein the initial cleaning stage includes applying either steam or water, or both, at a temperature of greater than 80° C. from an initial cleaning assembly that spans the entire width of the fabric to be cleaned;
   subjecting the fabric to be cleaned to a second cleaning stage following the initial cleaning stage downstream in the machine direction relative to the initial cleaning stage, wherein the second cleaning stage includes a second cleaning assembly, separate from the first cleaning assembly, that spans the entire width of the fabric to be cleaned; and
   wherein paper production is not interrupted during cleaning.

2. The method of claim 1, comprising using water in the initial cleaning stage, and wherein the water is superheated water.

3. The method of claim 1, further comprising, applying an air stream from an air knife to the fabric after the initial cleaning stage.

4. The method of claim 1, wherein the second cleaning assembly comprises an encapsulated cleaning shower.

5. The method of claim 1, wherein superheated water is applied during the second cleaning stage.

6. The method of claim 1, wherein both steam and water are applied during the initial cleaning stage.

7. The method of claim 1, wherein steam is applied during the second cleaning stage.

8. The method of claim 1, wherein both steam and superheated water are applied during the second cleaning stage.

9. The method of claim 1, wherein less than 0.5 g/m$^2$ of water remains in the fabric after the second cleaning stage.

10. The method of claim 1, wherein the initial cleaning assembly comprises a series of nozzles or a shower bar that span the entire width of the fabric to be cleaned by applying the steam or water, or both, to the entire width of the papermaking fabric simultaneously.

11. The method of claim 1, wherein the initial cleaning assembly comprises a series of nozzles or a shower bar that span the entire width of the fabric to be cleaned by reticulating back and forth to apply the steam or water, or both, across the entire width of the papermaking fabric.

12. The method of claim 1, wherein the second cleaning assembly comprises a series of nozzles or a shower bar that span the entire width of the fabric to be cleaned by applying a cleaning media to the entire width of the papermaking fabric simultaneously.

13. The method of claim 1, wherein the second cleaning assembly comprises a series of nozzles or a shower bar that span the entire width of the fabric to be cleaned by reticulating back and forth to apply a cleaning media across the entire width of the papermaking fabric.

14. The method of claim 2, further comprising using both steam and water in the initial cleaning stage, and wherein the superheated water is applied to a surface of the fabric after the application of steam.

15. The method of claim 8, wherein both steam and superheated water are applied to both sides of the fabric during the second cleaning stage.

16. A method of minimizing rewet of a paper web on a moving transfer or drying papermaking fabric during cleaning and during paper production, comprising:
   producing a paper web on a papermaking machine using a transfer or drying papermaking fabric to be cleaned, the fabric having a width and length and traveling in a machine direction;
   subjecting the fabric to be cleaned to an initial cleaning stage, wherein the initial cleaning stage includes the application of steam from an initial cleaning assembly that spans the entire width of the fabric to be cleaned;
   subjecting the fabric to be cleaned to a second cleaning stage following the initial cleaning stage downstream in the machine direction relative to the initial cleaning stage, wherein the second cleaning stage includes applying steam from a second cleaning assembly, separate from the first cleaning assembly, that spans the entire width of the fabric to be cleaned, wherein the second cleaning assembly comprises an encapsulated shower; and
   wherein the encapsulated shower further includes vacuum sources on both sides of the fabric; and
   wherein less than 0.5 g/m$^2$ of water remains in the fabric after the second cleaning stage, thereby minimizing the water available to rewet the paper web that contacts the papermaking fabric after cleaning.

17. A method of effectively cleaning a moving transfer or drying papermaking fabric during paper production without the use of VOCs, comprising:
   producing a paper web on a papermaking machine using a transfer or drying papermaking fabric to be cleaned, the fabric having a width and length and traveling in a machine direction;
   subjecting the fabric to be cleaned to an initial cleaning stage, wherein the initial cleaning stage includes application of steam and the application of superheated water at a temperature of greater than 100° C. from an initial cleaning assembly that spans the entire width of the fabric to be cleaned;
   subjecting the fabric to a second cleaning stage following the initial cleaning stage downstream in the machine direction relative to the initial cleaning stage, wherein a second cleaning stage includes application of steam and superheated water from a second cleaning assembly, separate from the first cleaning assembly, that spans the entire width of the fabric to be cleaned; and wherein paper production is not interrupted during cleaning.

18. The method of claim 16, wherein at least one of the initial cleaning assembly and the second cleaning assembly comprises a series of nozzles or a shower bar that span the entire width of the fabric to be cleaned by reticulating back and forth to apply the steam across the entire width of the papermaking fabric.

19. The method of claim 16, wherein at least one of the initial cleaning assembly and the second cleaning assembly comprises a series of nozzles or a shower bar that span the entire width of the fabric to be cleaned by applying the steam to the entire width of the papermaking fabric simultaneously.

20. The method of claim 17, wherein at least one of the initial cleaning assembly and the second cleaning assembly comprises a series of nozzles or a shower bar that span the entire width of the fabric to be cleaned by applying the steam and the superheated water to the entire width of the papermaking fabric simultaneously.

21. The method of claim 17, wherein at least one of the initial cleaning assembly and the second cleaning assembly comprises a series of nozzles or a shower bar that span the entire width of the fabric to be cleaned by reticulating back and forth to apply the steam and the superheated water across the entire width of the papermaking fabric.

\* \* \* \* \*